United States Patent
Bartunek et al.

(10) Patent No.: US 7,225,790 B2
(45) Date of Patent: Jun. 5, 2007

(54) VALVE DEVICE AND METHOD FOR INJECTING A GASEOUS FUEL

(75) Inventors: Bernd Bartunek, Monheim (DE); Alain Touchette, Vancouver (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 11/107,428

(22) Filed: Apr. 15, 2005

(65) Prior Publication Data

US 2005/0199746 A1   Sep. 15, 2005

Related U.S. Application Data

(63) Continuation-in-part of application No. PCT/EP2004/006130, filed on Jun. 7, 2004.

(30) Foreign Application Priority Data

Jun. 11, 2003  (DE) ................ 103 26 707

(51) Int. Cl.
   *F02B 3/00*  (2006.01)
   *B05B 1/08*  (2006.01)
   *F01L 1/34*  (2006.01)
(52) U.S. Cl. ............ 123/294; 239/102.2; 239/584
(58) Field of Classification Search ........ 123/294–296, 123/494, 498; 239/533.2, 533.6, 533.7, 533.8, 239/585.1; 73/119 A; 251/129.2, 129.16, 251/231, 232
See application file for complete search history.

(56) References Cited

U.S. PATENT DOCUMENTS

| 1,341,911 A | 6/1920 | Keller |
| 3,501,099 A | 3/1970 | Benson |
| 3,614,486 A | 10/1971 | Smiley |
| 4,022,166 A | 5/1977 | Bart |
| 4,101,076 A | 7/1978 | Bart |
| 4,503,820 A * | 3/1985 | Nakagawa ............ 123/357 |
| 4,530,487 A | 7/1985 | Tew et al. |
| 4,579,283 A | 4/1986 | Igashira et al. |
| 4,720,077 A | 1/1988 | Minoura et al. |
| 4,750,706 A | 6/1988 | Schlagmuller |
| 4,865,001 A | 9/1989 | Jensen |
| 5,048,564 A * | 9/1991 | Gaiardo ............ 137/599.07 |
| 5,094,429 A | 3/1992 | Dostert |
| 5,163,623 A * | 11/1992 | Seino ............... 239/585.3 |
| 5,479,902 A | 1/1996 | Wirbeleit et al. |

(Continued)

FOREIGN PATENT DOCUMENTS

DE    19543080 A1    5/1997

(Continued)

*Primary Examiner*—Stephen K. Cronin
*Assistant Examiner*—Johnny H. Hoang
(74) *Attorney, Agent, or Firm*—McAndrews, Held & Malloy, Ltd.

(57) ABSTRACT

A valve device and a method directly inject gaseous fuel into a combustion chamber. A rapid response in a simple and compact design is achieved by a piezoelectric, magnetostrictive, or electromagnetic actuator that acts on a transmission device that comprises at least two levers, which are connected in series to increase the lift of the actuator to actuate a valve. An associated sensor device detects the position of a valve element, such that the actuator can be controlled to reduce the free play between the actuator and the valve.

55 Claims, 4 Drawing Sheets

U.S. PATENT DOCUMENTS

| | | |
|---|---|---|
| 5,697,554 A | 12/1997 | Auwaerter et al. |
| 5,803,361 A | 9/1998 | Horiuchi et al. |
| 5,881,689 A | 3/1999 | Hochholzer |
| 6,057,692 A | 5/2000 | Allmendinger et al. |
| 6,079,636 A | 6/2000 | Rembold et al. |
| 6,186,474 B1 | 2/2001 | Fitzner et al. |
| 6,194,812 B1 | 2/2001 | Klugl et al. |
| 6,202,940 B1 * | 3/2001 | Kampichler ............ 239/88 |
| 6,240,905 B1 | 6/2001 | Boecking |
| 6,253,736 B1 * | 7/2001 | Crofts et al. ............ 123/498 |
| 6,390,069 B1 | 5/2002 | Jiang et al. |
| 6,494,382 B1 | 12/2002 | Stier |
| 6,787,973 B2 | 9/2004 | Frank et al. |
| 6,845,745 B2 | 1/2005 | Carey et al. |
| 2002/0165542 A1 | 11/2002 | Kirzhner et al. |
| 2002/0195904 A1 | 12/2002 | Sumrak et al. |
| 2003/0160202 A1 | 8/2003 | Boecking |

FOREIGN PATENT DOCUMENTS

| | | |
|---|---|---|
| DE | 197 12 374 A1 | 10/1998 |
| DE | 197 51 661 A1 | 5/1999 |
| DE | 19757659 C1 | 6/1999 |
| DE | 19929589 A1 | 1/2000 |
| DE | 19857615 C1 | 7/2000 |
| DE | 19905340 A1 | 8/2000 |
| DE | 199 30 309 A1 | 1/2001 |
| DE | 199 38 999 A1 | 3/2001 |
| DE | 10130857 A1 | 3/2002 |
| DE | 10052336 A1 | 5/2002 |
| DE | 10101799 A1 | 7/2002 |
| DE | 10120709 A1 | 10/2002 |
| DE | 10220498 A1 | 11/2002 |
| DE | 10129375 A1 | 1/2003 |
| WO | WO 99/17014 | 4/1999 |
| WO | WO 02/086983 A2 | 10/2002 |
| WO | WO 02/086983 A3 | 10/2002 |
| WO | WO 2004/070929 | 8/2004 |

* cited by examiner

VALVE DEVICE AND METHOD FOR INJECTING A GASEOUS FUEL

CROSS-REFERENCE TO RELATED APPLICATION(S)

This application is a continuation-in-part of International Application No. PCT/EP2004/006130, having an international filing date of Jun. 7, 2004, entitled "Valve Device and Method for Injecting a Gaseous Fuel". International Application No. PCT/EP2004/006130 claimed priority benefits, in turn, from German Patent Application No. 10326707.7 filed Jun. 11, 2003. International Application No. PCT/EP2004/006130 is also hereby incorporated by reference herein in its entirety.

FIELD OF THE INVENTION

The present invention relates to a valve device and a method for the direct and accurate injection of gaseous fuel into a combustion chamber, as well as the use of spring(s) and a position sensor in such a valve device to reduce free play between actuation elements.

BACKGROUND OF THE INVENTION

In the following paragraphs, prior art references pertaining to the subject matter of the application are set out.

German Patent Publication No. DE 195 43 080 A1 discloses a hydraulically operated fuel injection valve for a gas engine. One disadvantage of hydraulically operated valves is the comparatively slow response characteristic.

German Patent Publication No. DE 100 52 336 A1 discloses a fuel injection valve that is hydraulically opened, whereby the hydraulic pressure is controlled by means of an electromagnetic or piezoelectric control valve. But the response characteristic and the scope of control options, in particular with respect to multiple injections or the shaping of the injection behavior, are not optimal.

German Patent Publication No. DE 101 29 375 A1 discloses an injector with a piezoelectric actuator, which acts on a control valve, if necessary via a transmission device, to control the injection of liquid fuel through a needle valve. The piezoelectric actuator consists of a stack of piezoelectric elements, whereby the piezoelectric element adjacent to the control valve is executed as a sensor to detect contact between the piezoelectric actuator and the control valve or to detect the opening of the control valve. The design of this injector is not suitable for the injection of gaseous fuel.

German Patent Publication No. DE 199 29 589 A1 discloses an injector with a piezoelectrically actuated control valve, which in turn hydraulically controls a needle valve for the injection of liquid fuel. Also provided is an electrical assembly to determine whether the control valve has opened, to calibrate the piezoelectric actuator, or to compensate for temperature related variations.

German Patent Publication No. DE 199 05 340 A1 discloses a method and a device to adjust and re-adjust electrical piezoelectric actuators, whereby a direct voltage is applied to the piezoelectric actuator to set a desired idle lift between the piezoelectric actuator and a valve actuating element, whereby if necessary a control voltage, for example a pulsed control voltage, can be superimposed onto the direct current voltage, and whereby the direct current voltage effects a longitudinal deformation of the piezoelectric actuator that is independent of the control voltage, wherein "lift" is the distance moved by the valve actuating element from a closed position.

German Patent Publication No. DE 198 57 615 C1 discloses a lever transmission to transfer the force resulting from displacement of an actuator to a final control element, in particular in an injection valve. The lever transmission is in contact with the actuator and the final control element via sliding elements, whereby the contact surfaces to the sliding elements or a thrust bearing are executed to have convex or concave shapes, respectively, and whereby the radii of the associated surface areas are matched in order to reduce surface pressure.

German Patent Publication No. DE 101 30 857 A1 discloses a fuel injector with piezoelectric elements that are in contact with a stud-like positioning element, and by means of the positioning element can actuate a following valve element to open or close an injection opening. When the injection opening is closed, the distance between the positioning element and the valve element preferably is measured by means of a scanning coil and regulated to a desired value, in order to be able to compensate for thermal expansion under different operating conditions and for mechanical deformation for differing fuel pressures and loads.

German Patent Publication Nos. DE 101 20 709 A1 and DE 102 20 498 A1 disclose fuel injection valves that comprise a piezoelectric actuator and a single transmission device that comprises a single lever.

German Patent Publication No. DE 197 57 659 C1 discloses an injection valve with a piezoelectric actuator and a valve element that can be actuated via two transmission elements switched in parallel. A compensating element with a curved face is arranged between the transmission elements and the piezoelectric actuator, in order to compensate for a tilting of the piezoelectric actuator and for differing overall heights of the transmission elements.

German Patent Publication No. DE 101 01 799 A1 discloses a fuel injection valve, in particular for a common rail system, whereby a piezoelectric actuator acts via a disc-shaped actuating element upon two kidney-shaped valve lifters, which in turn actuate a valve element.

Valve devices known in the art have the disadvantage that in the opened valve state the aperture cross section defined by the valve lift and the valve geometry is comparatively small, so that for the injection of gaseous fuel very high gas pressures are necessary to supply an adequate quantity of fuel into an associated combustion chamber or space. For this reason there is a need for a valve device that allows an adequate supply of gaseous fuel during full-load operation but also allows very short injection periods at idle speeds or at low engine loads.

Furthermore, there is a need for a valve device and a method for the injection of gaseous fuel into the combustion chamber of an internal combustion engine that allows a simple and cost-effective design and a rapid response behavior, and in particular allows multiple injections of fuel or injections with interruptions during one power cycle and/or the shaping of the injection behavior over an injection period.

An objective of the present technique is to provide a valve device and a method for the injection of gaseous fuel into the combustion chamber of an internal combustion engine and the use of spring(s) in a valve device to allow the following: An adequate supply of gaseous fuel, in particular during full load operation of the engine; A simple, cost-effective, and wear-resistant design and/or a rapid response behavior as well as a variable valve lift. In particular, multiple or interrupted injections of fuel during one power cycle and/or a shaping of the injection behavior during the injection period.

SUMMARY OF THE INVENTION

A fuel injection valve of the type disclosed herein is sometimes referred to as an injection valve, an injector, or a gas injection nozzle. When describing the apparatus and technique disclosed herein, the term "valve device" shall be used to describe a fuel injection valve assembly that comprises a valve operative between an open position and a closed position to control the injection of a gaseous fuel, an actuator operative to produce a displacement, usually but not necessarily in a linear direction, and a transmission device operative to receive and respond to the displacement produced by the actuator and transmit a greater displacement to the valve.

When describing the apparatus and technique disclosed herein, the term "displacement" shall be used to describe a change in the position of a moveable component. When such a change of position brings the component into contact with another component, the resulting force can be considered to be composed of force vectors. In the present case of an actuator and an associated transmission device, displacement of the actuator imparts, upon contact with the transmission device, a corresponding force to the transmission device. The term "linear displacement", therefore, refers to movement in the direction of the axis of the transmission device, which transmits the corresponding force vector from the actuator to the component the transmission device acts upon (a valve in the present embodiments). Accordingly, an actuator could conceivably be designed to undergo a displacement that traverses a non-linear path, such as, for example, an arcuate path. The term "displacement" should therefore be considered to include movement of a first component (an actuator in the present embodiments) that is normally directed along a linear path, but could also encompass movement that is directed along a non-linear path that nevertheless imparts, upon contact with a second component being acted upon (a transmission device in the present embodiments), a corresponding force vector in the direction of the axis of the second component that, in turn, acts upon a third component (a valve in the present embodiments).

To achieve favorable response characteristics for a valve opening that is adequately large for the injection of gaseous fuel, that is, with an adequately large valve lift, the present technique provides a combination of a direct drive, such as an actuator that is operated piezoelectrically or magnetostrictively, or if required electromagnetically to produce a displacement, and an associated transmission device disposed between the actuator and a valve. The transmission device is operative to mechanically increase the displacement received from the actuator, via the force imparted to the transmission device due to displacement of the actuator, to produce a greater valve lift in the valve. The present technique allows a simple design of the valve device, whereby rapid response characteristics and an adequately large valve opening for the injection of gaseous fuel can be achieved.

In a preferred embodiment of the valve device the transmission device comprises at least two levers, which are arranged in series in order to further increase the lift beyond the displacement produced by the actuator to actuate the valve. An advantage of this embodiment is that it allows a simple design, in which the two levers can be employed to provide a compact construction and a high transmission ratio, which is desirable for the injection of gaseous fuel.

As used herein, the transmission ratio is the ratio between the valve lift and the displacement of the actuator. That is, a transmission ratio of five means that the valve lift is five times greater than the corresponding displacement produced by the actuator.

In preferred embodiments the actuator comprises one or more magnetostrictive or piezoelectric drive elements. Piezoelectric or magnetostrictive drive elements can be used to produce linear displacement through linear expansion or contraction of the drive element's physical dimensions, by controlling an electric current that is used to produce a magnetic field around one or more magnetostrictive drive elements or by controlling an electric voltage that is applied to a stack of piezoelectric drive elements. By operation of the transmission device, the mechanical displacement produced by the piezoelectric or magnetostrictive drive elements directly causes, via the mechanical force associated with the displacement, a corresponding linear displacement in the valve, and accordingly, such drive elements are referred to herein as "direct drive elements".

In combination with the disclosed transmission device, compared to conventional hydraulically actuated valve devices, the disclosed valve device with an actuator driven by direct drive elements can achieve faster switching and response times, and more accurate valve needle position control, and accordingly, an advantage of this valve device is that it becomes practical to have multiple or intermittent injections of fuel during a power cycle and/or a shaping of the fuel injection behavior during the injection period (variations of the flow or the injection rate during the injection period). That is, a rapid response and a variable valve lift or opening cross section of the valve make it possible, for example, to accurately set: (a) the injection period and injection quantity; (b) the number of injection events, in the case of multiple or intermittent injection of fuel during each injection event; and, (c) the shape of the injection behavior during the injection period Another advantage of the disclosed valve device, is that variable valve lift control can be used so that a smaller valve lift can be commanded during idling or partial load operation of the engine whereby smaller fuel gas quantities can be injected by restricting fuel injection volume by means of the valve position and/or by adapting valve lift to account for different supply pressures.

Another aspect of the present technique is the use of spring(s) between the actuator and the transmission device or at the transmission device, so that free play occurring in the drive train towards the valve—in particular when the actuator is turned off or deactivated—takes effect only between the actuator and the transmission device. In this regard, the spring(s) act in the actuating direction directly or indirectly on the transmission device to reduce or eliminate free play, thereby reducing wear and tear, and producing an accurate and rapid response characteristic.

A further preferred aspect of the technique is that the valve can be associated with a sensor device to detect the position or lift of a valve element that is movable by the transmission device. The direct detection of the opening of the valve (that is, the lift of the valve element) makes it possible to make adjustments using the actuator to reduce or limit the free play between the actuator and the valve element, which is especially relevant when large transmission ratios are employed because it allows one to achieve rapid and controlled response characteristics for accurately timed valve openings. The term "free play" is used herein to describe the condition where displacement caused by the actuator does not produce a corresponding movement of the valve element. With a conventional valve device, the actuator is not normally energized when the engine is shut down or, if running, between injection events, and a spring typically mechanically biases the valve element in the closed position. Free play can be caused by a number of factors, such as variability introduced during the manufacturing process, the effects of differential thermal expansion, and/or component wear.

BRIEF DESCRIPTION OF THE DRAWINGS

Further advantages, features, characteristics, and aspects of the present invention will be explained in the following description of preferred embodiments with the help of the drawings.

DETAILED DESCRIPTION OF PREFERRED EMBODIMENT(S)

Identical or similar parts are labeled by the same reference labels in the figures, whereby corresponding or comparable functions can be achieved, even if a repeat description is omitted for simplicity.

Figure 1:
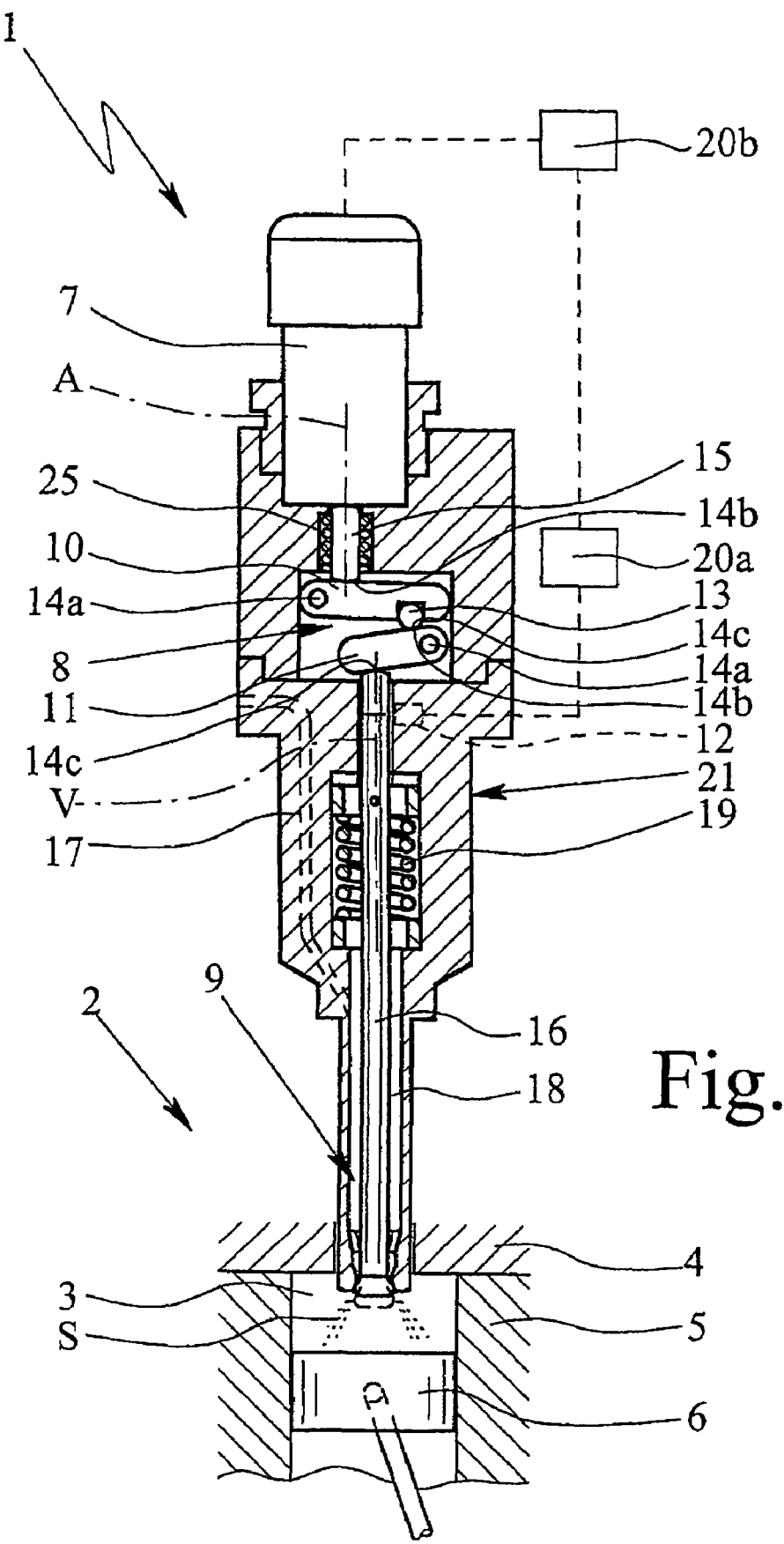
FIG. 1 shows a schematic sectional view of a first embodiment of the proposed valve device and part of an internal combustion engine.

FIG. 1 shows a schematic not-to-scale illustration of proposed valve device 1 for the injection of gaseous fuel, such as hydrogen, natural gas, a mixture of hydrogen and natural gas, or similar, for a partially shown internal combustion engine 2. Valve device 1 in particular serves to directly inject the fuel into combustion chamber 3 of internal combustion engine 2, as indicated by dashed fuel jets S. Furthermore, combustion chamber 3 is bordered by a cylinder, shown in FIG. 1 as cylinder block 5, with piston 6 free to move therein.

Valve device 1 normally is mounted in cylinder head 4 of internal combustion engine 2. Other components, such as intake valves, discharge valves, or an ignition device, are not shown for reasons of simplicity.

As mentioned above, valve device 1 serves to inject gaseous fuel into associated combustion chamber 3, preferably directly. The fuel is made available by means of a feed device (not shown) or a pressure tank (not shown). If required, the feed device can comprise a compression device (not shown) such as a pump or compressor to pressurize the fuel to a desired pressure, and a pressure controlling device (not shown), such as a pressure regulating valve or similar. The compression device can be mechanically driven directly by the engine, or indirectly, for example, by a hydraulic system with a hydraulic pump driven by the engine.

Valve device 1 comprises one actuator 7, preferably enclosed, one transmission device 8 that can receive a linear displacement from actuator 7, and that transmits the linear displacement to a valve 9, whereby transmission device 8 transmits a linear displacement greater than the linear displacement produced by actuator 7. That is, valve 9 can be actuated, in particular openable, by actuator 7 by means of transmission device 8, which increases the linear displacement produced by actuator 7.

Actuator 7 can comprise an electromagnetic driver, but preferably comprises one or more piezoelectric or magnetostrictive direct drive elements. A plurality of piezoelectric direct drive elements can be arranged one on top of the other to form a "stack" of piezoelectric elements. Actuator 7 is activated and controlled electrically. As already noted, piezoelectric or magnetostrictive direct drive elements allow a very rapid response and the capability to accurately control the amount of displacement during an injection event. Such direct drive elements are also capable of providing high actuating forces.

However, for piezoelectric or magnetostrictive direct drive elements the linear displacement is relatively small compared to other types of valve actuators, such as ones that are hydraulically or electromagnetically driven. The linear displacement produced by direct drive elements typically amounts to approximately 20 to 60 µm depending upon the length of the direct drive elements. For the injection of a gaseous fuel a larger aperture cross section is desirable in order to be able to inject an adequate amount of fuel into combustion chamber 3 within the comparably short injection period. Correspondingly, a large valve lift is desirable and advantageous. For this reason, transmission device 8, which amplifies the lift of actuator 7, possesses a transmission ratio that is greater than 5, preferably greater than 10 or 12, and in some more preferred embodiments the transmission ratio is greater than 15.

To facilitate the realization of such high transmission ratios, transmission device 8 preferably comprises at least two levers 10 and 11 arranged in series. The use of at least two levers 10, 11 instead of just one lever allows the use of a desirable, comparatively large transmission ratio while maintaining a compact design. In a preferred embodiment, transmission device 8 amplifies the linear displacement of actuator 7 exclusively with mechanical leverage.

In preferred embodiments, levers 10, 11 can be disk-shaped, oblong, plate-shaped or rod-shaped. Levers 10, 11 preferably are manufactured from materials having high strength to weight ratios, such as materials comprising at least one of a lightweight metal alloy, a composite material (such as carbon-fiber-reinforced plastic), and ceramic materials. A high strength to weight ratio for levers 10, 11 is important because lowering the weight of the levers reduces inertial forces and in particular reduces the moving mass.

High rigidity is also important because an important aspect of levers 10, 11 is that they be substantially rigid when the valve is being opened and closed to ensure a precise and rapid response. That is, it is desirable for the levers to have a high modulus of elasticity such that the levers remain rigid when subjected to the forces transmitted through the levers when the valve is being actuated.

In preferred arrangements, levers 10, 11 are arranged essentially in parallel to each other and/or on top of each other. This results in a compact design. In particular, series-connected levers 10, 11 can form a folded drive train, which allows a compact and space-saving configuration.

Actuator 7 preferably acts directly on transmission device 8, that is, on first lever 10. As shown by two-lever transmission device 8 indicated in FIG. 1, second lever 11 preferably acts directly on valve 9. However people skilled in this technology will understand that other designs or the use of connecting pieces or functionally similar devices are also possible.

Free play between actuator 7 and valve 9 is especially disadvantageous in the case of the suggested use of several levers 10, 11, such as in the case when transmission device 8 has a large transmission ratio. In particular, such free play is disadvantageous with regard to the desired rapid response and/or an accurate metering or shaping of the injection behavior, as well as with respect to reducing wear and tear of the contact surfaces.

To reduce the above-mentioned free play, valve device 1 is equipped with sensor device 12, which is associated with valve 9 and serves to detect an opening or the status of valve 9, so that the above-mentioned actuator/valve free play can be compensated for, reduced, or limited by a suitable control of actuator 7. Free play can result, for example, from the effects of wear and tear or from changes in temperature that cause differential thermal expansion or contraction of components within valve device 1. Accordingly, free play can change dynamically as a result of one or more variables, for example, as a function of time as wear and tear increases, and/or as a function of temperature.

Sensor device 12 preferably is integrated directly into valve device 1, and preferably is arranged in immediate proximity of valve 9. By way of example, the sensor that is contained in the sensor device can be a displacement transducer, a micro-position encoder, proximity pick-up, or similar device, which directly or indirectly detects the current status or position of valve 9 and more specifically the position indicating the degree of opening of movable valve element 16. The data acquisition can, for example, be carried out capacitively or on the basis of an eddy effect, Hall Effect, and/or changes in the electromagnetic field.

To reduce wear and tear it is preferred that at least regions of levers 10, 11 are provided with a suitable wear-proof coating, and/or are provided with a preferably ceramic or hard-metal insert 13, as for example is indicated for first lever 10 in FIG. 1.

Transmission device 8, comprising levers 10, 11, is preferably designed in a way that eliminates the need for lubricants. But a lubricant can be used if desired to reduce wear.

Lever 10 is free to pivot about support point 14*a*. Levers 10 and 11 are acted on at respective contact points 14*b*. The increased or amplified travel is then transferred from lever 10 or 11 at respective output point 14*c*. The above-mentioned 'points' can also be line-shaped and/or two-dimensional contact regions that can shift in dependence on the lever position. Levers 10, 11 can be supported either in a floating or a fixed mount. This will be explained later with the help of FIG. 4.

To achieve a compact configuration, two levers 10, 11 at least predominantly extend at right angles to the working axis or travel axis A of actuator 7 and to the axis of motion or operation V of valve 9 or valve element 16.

The two axes A and V preferably are oriented coaxially or with a parallel offset with respect to each other. This allows a low-profile oblong design of valve device 1. Alternatively, the axes A and V can be inclined with respect to each other, for example, crosswise. The orientation can be made so that valve device 1 fits within the physical space available for a particular engine design.

Actuator 7 preferably acts directly on first lever 10 at contact point 14*b* by means of plunger 15 or similar device. Plunger 15 is provided with a preferably cambered contact surface to contact first lever 10, so that one obtains an essentially point-shaped bearing surface, which is insensitive to rotations or misalignments.

Extending actuator 7, that is, to produce a linear displacement, causes first lever 10 in the illustration of FIG. 1 to rotate clock-wise, resulting in a downward displacement.

The amplified lift is transferred from output point 14*c* of first lever 10—in this case from the surface of ceramic insert 13—to contact point 14*b* of second lever 11. Contact point 14*b* of second lever 11 preferably is positioned in close proximity of support point 14*a* of second lever 11.

Figure 3:
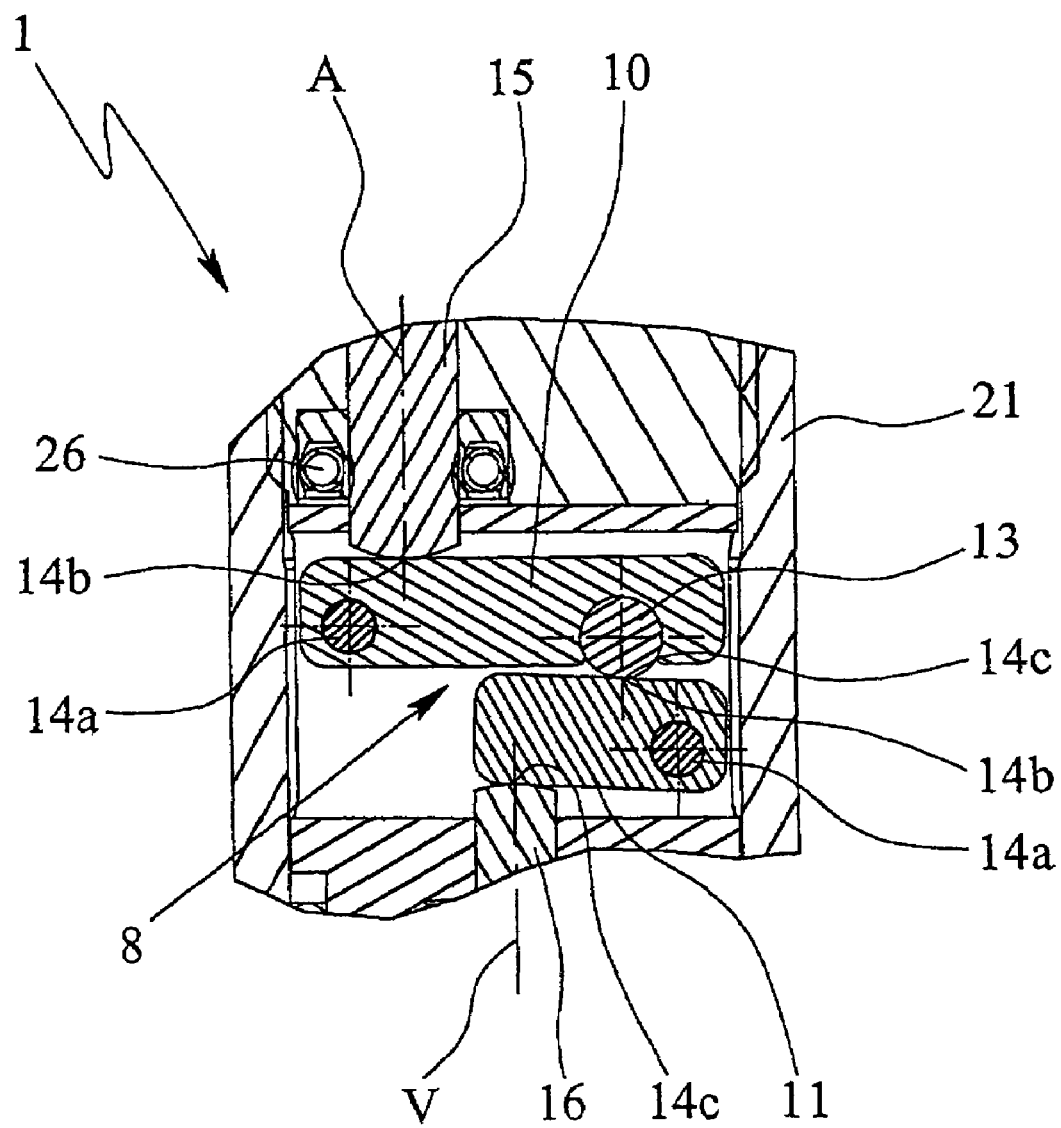
FIG. 3 shows a schematic sectional view of part of a transmission device of the valve device of FIG. 2.

As indicated in FIG. 3, levers 10, 11 preferably possess line-shaped mounts (line-shaped form of support points 14*a*). This makes it possible to achieve a clearly defined support and kinematics. The bearing surface between two levers 10, 11, which serves to transfer the movement, preferably also is essentially point shaped.

Subsequently, second lever 11 transfers the lift of actuator 7—which has already been amplified by first lever 10—from its output point 14*c* to valve 9, in particular directly to valve element 16, namely a valve needle, valve head, plunger, or similar device of valve 9. Again, the bearing surface between second lever 11 and valve element 16 or a transfer element preferably is point-shaped, which is achieved by a corresponding cambered design of a contact surface.

When valve 9 is actuated to cause valve device 1 to open, first lever 10 rotates second lever 11 downward, but counter-clockwise according to the illustrated arrangement of FIG. 1.

As a result of the amplified lift of actuator 7, valve 9 opens sufficiently to allow the gaseous fuel, which has been supplied to valve cavity 18 via dotted-line channel 17, to flow into combustion chamber 3.

A sufficiently smooth operation of valve 9 or of valve element 16 can be achieved by guiding only sections of valve element 16, preferably in the area of the two ends, and preferably lubricant-free with the proper choice of materials.

To end the injection, actuator 7 is deactivated and valve 9 is closed by associated restoring device 19, which pushes back transmission device 8 and plunger 15. Restoring device 19 preferably is integrated into valve 9 or associated with valve 9 and acts directly on valve element 16.

Restoring device 19 comprises a spring, shown in the illustrated example as a helical spring, whereby valve 9 or valve element 16 is actuatable, in particular openable, against the force of this spring. But it is also possible to employ a different biasing mechanism or other biasing or spring-like mechanism for this purpose.

Valve device 1 preferably is equipped with spring(s) 25, such as a helical spring, which is associated with transmission device 8 or plunger 15 in order to preload at least transmission device 8, and if required also plunger 15, towards valve 9, that is, in the operating direction. In this manner the free play between actuator 7 and valve 9 or valve element 16 that may otherwise exist when valve 9 is closed and when actuator 7 is in an idle state, can only occur between actuator 7 and plunger 15 or between plunger 15 and transmission device 8. That is, spring 25 is operative to remove free play between the other components of the drive train. But to ensure a reliable closing of valve 9, the opening force exerted on valve element 16 by spring 25 is significantly less than the closing force exerted by restoring device 19.

Valve device 1 is equipped with an associated signal processor 20*a*, which preferably is integrated into valve device 1 and processes the signals of sensor device 12 with regard to the position or lift of valve element 16 and makes this data available for the subsequent control of control device 20*b* that is associated with valve device 1.

Control device 20*b* can be the engine controller or a separate electronic control unit that controls actuator 7 in response to signals from the engine controller and sensor device 12 in a manner so that free play is detected between actuator 7 and valve element 16 when valve 9 is in the closed or non-activated state, while in its rest position. Detection of free play and the adjustment process that is described below to reduce or eliminate free play will be referred to herein as "rest control".

Rest control preferably is realized by means of an adjusting process, in which—starting at a predetermined time when valve 9 is inoperative or at the time of closing of valve 9, actuator 7 is progressively activated, in particular slowly or stepwise, or the linear displacement produced by actuator 7 is increased in the actuation direction of valve 9, until sensor device 12 detects a predetermined level of resistance to further movement or the opening of valve 9, for example, by detecting a lift of valve element 16. At this time, the activation of actuator 7, that is, its linear displacement, is reduced by a predetermined adjustment amount to a base value in order to set a value at which the free play between actuator 7 and the transmission device 8 is limited to less than the predetermined adjustment amount.

This means that in this adjustment process, depending upon the type of actuator, control device 20b commands a current or voltage to actuator 7 that is slightly reduced from the commanded current or voltage that resulted in the detected resistance or lift so that valve 9 remains closed but with a current or voltage commanded to actuator 7 that limits or reduces free play between actuator 7 and transmission device 8. This reduced level of current or voltage that is applied to actuator 7 when valve 9 is closed and at rest sets a base value, which defines a starting position, from which actuator 7 will be activated as needed, to open valve 9 to a commanded lift during subsequent injection events.

The above-described adjustment process can be repeated intermittently after a predetermined time or the time between the rest control adjustment process can vary in dependence on a number of operating parameters, such as the number of injection events, the number of engine cycles, or engine cycles, and/or the rest control adjustment process can be commanded to occur if valve element 16 does not completely return to its closed position when valve 9 is commanded to its inoperative state. During the rest control adjustment process the base value is re-determined and can be used for the next and the subsequent injection events. One design variant offers the possibility to determine the future base value from a current newly determined base value and previous base values, for example using simple or weighted averaging with the more recent base values being weighted more than older base values.

As the base values change over time, they offer an insight into the wear and tear of the components in the drive train. For this reason, the base values are preferably recorded continuously and analyzed to detect wear, for example as part of inspections or troubleshooting.

It should be noted that the predetermined specific amount of the actuator's linear displacement that is used as part of the rest control adjustment process to reduce the lift of actuator 7 (from the value at which resistance or lift was detected) to its determined base value can be fixed in advance, can be dependent on operating parameters or characteristics control maps or look up tables, and/or can be determined from previous values.

It should also be noted that the above-mentioned rest control adjustment process is preferably implemented with feedback and in this manner makes it possible to automatically compensate for the free play or wear between actuator 7 and valve 9 or transmission device 8.

After each rest control adjustment process is completed, actuator 7 can be deactivated. Immediately preceding a desired injection event, actuator 7 can then be activated to the base value so that when the injection event is commanded to begin, the timing for beginning the injection event can be more accurately timed because free play between actuator 7 and transmission device 8 is reduced or limited. To open valve device 1, preferably an initial slow activation or lift motion of actuator 7 takes place before the desired timing for injection, until the free play established by the rest control adjustment process has been overcome, so that one can avoid excessive collisions of the surfaces separated by the free play, thereby reducing wear. For multiple injection events in a single engine cycle, between injection events, to improve valve responsiveness and precision, actuator 7 can be commanded to the base value instead of being fully deactivated.

Preferably, control device 20b carries out the injection control, comprising control of the injection timing, the injection duration, the valve lift, the opening and closing speeds, control of the injection rate shape during an injection event, and other parameters that can be controlled by the position of valve element 16 by the corresponding activation or triggering of actuator 7. Control device 20b can carry out the injection control using characteristic-map control or by reference to a look up table, and/or in dependence on the engine load or other operating parameters.

Naturally, the maximum aperture cross section of valve 9 is matched to the full-load operation of engine 1.

In the first embodiment, valve 9 is executed so that it opens outward, that is, towards combustion chamber 3.

In the illustrated embodiment, the fuel preferably is injected into combustion chamber 3 along a cone shape—in particular with an opening angle between 60° and 120°.

But if required, it is also possible to position a nozzle (not shown) with several passage openings at the end that projects into combustion chamber 3 in order to produce a corresponding number of fuel jets S that are directed in the desired directions.

Valve device 1 preferably comprises general housing 21, which can be a multi-part housing 21, as containment and/or mounting for integration of actuator 7, transmission device 8, valve 9, restoring device 19, the nozzle, sensor device 12, and/or signal processor 20a.

Further embodiments will be illustrated in the following with the help of FIGS. 2, 3, and 4. For simplification, sensor device 12, control device 20, and channel 17 are not shown in these embodiments. The explanations concerning like components apply accordingly and are not repeated in the description of the following embodiments.

Figure 2:
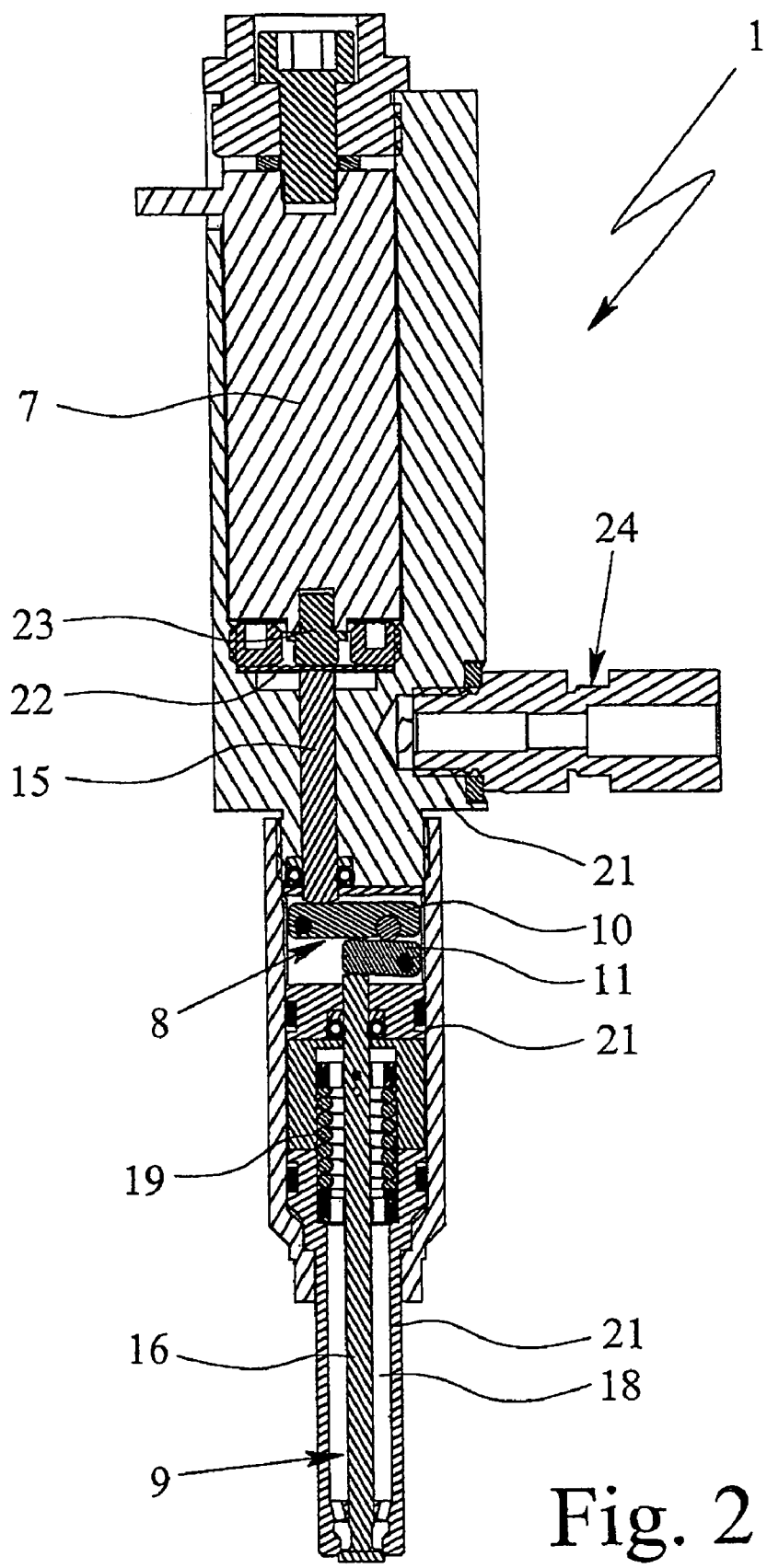
FIG. 2 shows a schematic sectional view of a second embodiment of the proposed valve device.

In the second embodiment of valve device 1 shown in FIG. 2, actuator 7 is preferably enclosed and sealed gas-tight against transmission device 8, in particular by means of membrane 22. In the illustrated example, membrane 22 is installed or arranged between plunger 23 of actuator 7 and plunger 15 acting on transmission device 8.

According to the second embodiment, valve device 1 is equipped with lateral connection 24 to supply the fuel. Here as well, connection 24 communicates with interior space 18 of valve 9. As mentioned above, channel 17, as it is indicated in FIG. 1, is not shown.

FIG. 3 shows a sectional partial view of transmission device 8 of valve device 1 according to the second embodiment of FIG. 2. Transmission device 8 in this embodiment is fundamentally equivalent to the transmission device according to the first embodiment. FIG. 3 in particular illustrates the positions of support points 14a, contact points 14b, and output points 14c of levers 10 and 11.

Support points 14a of levers 10, 11 are preferably arranged on opposite sides, that is, essentially opposing each other, with respect to axis V of valve 9. This is very conducive to a compact design.

FIG. 3 shows a design variant with circumferential seal 26 associated with plunger 15, in particular in the form of a possibly rollable O-ring, which is used to seal actuator 7 against fuel. Seal 26 can be provided in addition or as an alternative to membrane 22.

Figure 4:
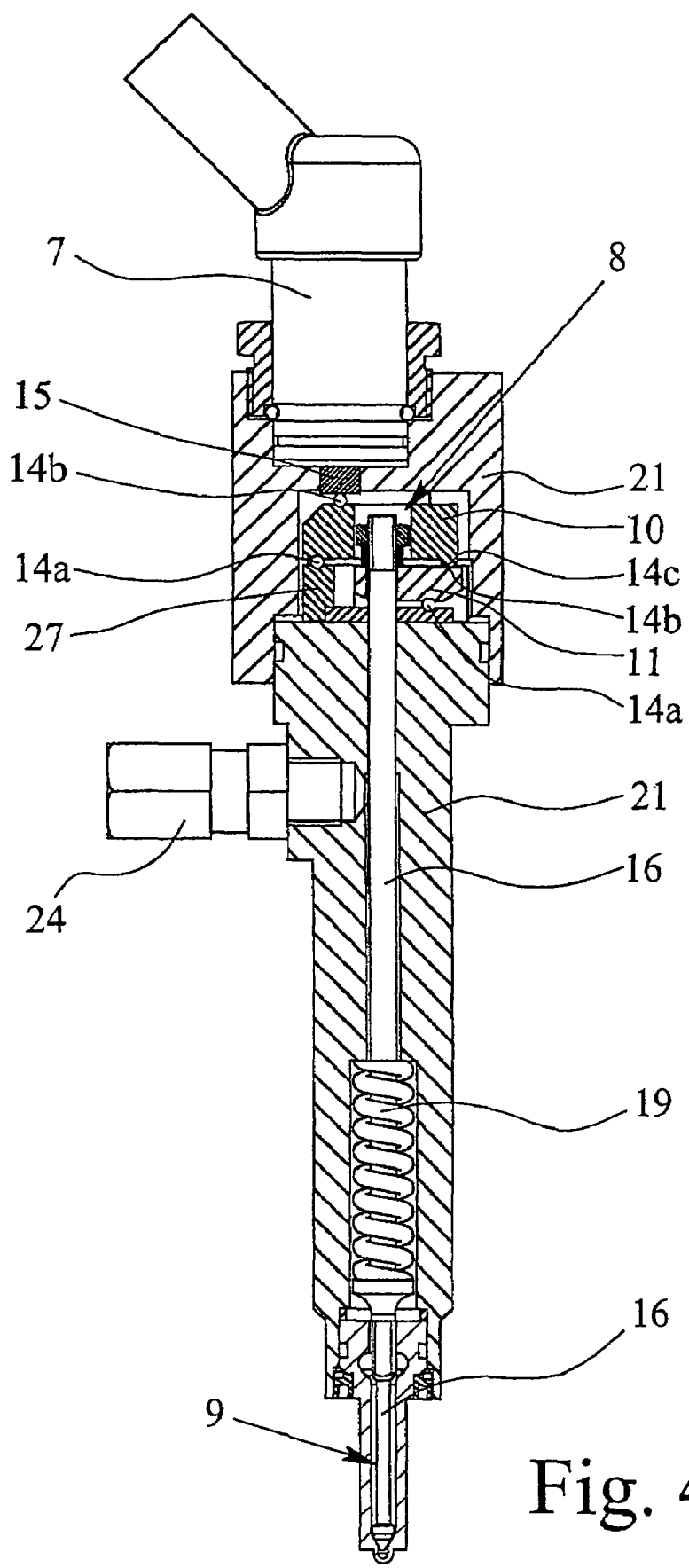
FIG. 4 shows a schematic sectional view of a third embodiment of the proposed valve device.

The schematic sectional view of FIG. 4 shows a third embodiment of valve device 1. Here as well, lateral connection 24 for supplying the fuel is provided.

The third embodiment differs in important respects from the first and second embodiments. In the third embodiment, valve 9 is executed as an inward-opening needle valve and accordingly the transmission device is executed slightly different. Unlike the first and second embodiments, in the third embodiment, the direction of motion, that is, the direction of valve lift, of actuator 7 is directionally opposite from the resulting motion of valve 9 and valve element 16. This is achieved by positioning output point 14c of first lever 10, and thus input point 14b of second lever 11, on the outside of support point 14a of second lever 11; that is, support point 14a of second lever 11 is positioned between contact point 14b and output point 14c of second lever 11.

Upon activation of actuator 7, both levers 10, 11 swing in the same direction of rotation, namely both clockwise, so that lower lever 11 swings upward, and lifts valve element 16—which preferably penetrates through lever 11—against the force of restoring device 19, that is, upward according to the illustration of FIG. 4.

FIG. 4 further illustrates the preferably floating support of levers 10, 11. By way of example, insert 27 is disposed within housing 21 and supports levers 10 and/or 11 and preferably contains a recess as lateral guidance for levers 10 and/or 11.

In the third embodiment, levers 10 and 11 are preferably executed essentially rod-shaped, oblong, plate-shaped, or ring-shaped, whereby the actual support and mechanism otherwise essentially corresponds to those of the first two embodiments.

The disclosed embodiments for valve device 1 allow trigger times and opening periods of 0.1 ms and thus allow multiple injections of fuel during one engine cycle.

One general advantage is that valve device 1 can be manufactured more cost-effectively than prior art valve devices, particularly where a piezoelectric actuator is employed for actuator 7.

As a general remark, the individual transmission and valve components can be selected to be compatible with exposure to the fuel but, depending upon the fuel, it can be desirable to isolate the actuator from the fuel. For example, this is particularly important if the fuel is hydrogen, since some compositions of the disclosed direct drive elements are not compatible with exposure to hydrogen.

While particular elements embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A valve device for injecting a gaseous fuel into an internal combustion engine, the valve device comprising:
   (a) an actuator capable of being activated to produce a displacement;
   (b) a valve comprising a valve element that is movable to open said valve to inject said gaseous fuel by activation of said actuator, wherein displacement of said movable valve element from a closed position is defined as valve lift;
   (c) a transmission device with mechanical leverage interposed between said actuator and said valve, said transmission device having said movable valve element displacement applied thereto and being operative to produce a valve lift that is greater than said displacement; and
   (d) a sensor device associated with said valve element of said valve to detect the position of said valve element.

2. The valve device of claim 1 wherein said transmission device comprises at least one series-connected lever to receive said displacement and produce said valve lift.

3. The valve device of claim 2 wherein said transmission device comprises at least two series-connected levers to receive said displacement and produce said valve lift.

4. The valve device of claim 1 wherein said actuator is activated by at least one of an electromagnetic, a piezoelectric and a magnetostrictive driver.

5. The valve device of claim 1 wherein said actuator has a working axis defined by the direction of said displacement, and said valve has a working axis defined by the direction of movement of said valve element, and said working axis of said actuator is offset in parallel or extends coaxially with respect to said operating axis of said valve.

6. The valve device of claim 1 wherein said actuator has a working axis defined by the direction of said displacement, and said valve has a working axis defined by the direction of movement of said valve element, and said working axis of said actuator extends inclined or crosswise with respect to said operational axis of said valve.

7. The valve device of claim 1 wherein said transmission device operates to increase said valve lift exclusively with mechanical leverage and said transmission device acts directly on said valve to activate said valve member.

8. The valve device of claim 1 wherein said transmission device has a transmission ratio greater than 5.

9. The valve device of claim 8 wherein said transmission device has a transmission ratio greater than 10.

10. The valve device of claim 9 wherein said transmission device has a transmission ratio greater than 12.

11. The valve device of claim 10 wherein said transmission device has a transmission ratio greater than 15.

12. The valve device of claim 2 further comprising a spring associated with said transmission device, wherein said spring allows free play between said actuator and said transmission device or a transfer element arranged in between, and removes free play between said lever(s) of said transmission device and between said transmission device and said valve.

13. The valve device of claim 2 wherein said at least one lever is rigid when said transmission device is operative.

14. The valve device of claim 2 wherein said at least one lever is one of disk-shaped, oblong, plate-shaped and rod-shaped.

15. The valve device of claim 2 wherein said at least one lever is manufactured from materials comprising at least one of a lightweight metal alloy, a composite material and a ceramic.

16. The valve device of claim 2 wherein said at least one lever is one of (i) coated in at least some areas, (ii) provided with a ceramic, and (iii) hard-metal insert for the purpose of reducing wear.

17. The valve device of claim 2 wherein said at least one lever is pivoted so as to be free to rotate around respective support points, whereby a respective contact point is positioned between said respective support point and an output point.

18. The valve device of claim 17 wherein said respective lever contact points are arranged on opposite sides of an operating axis of said valve, whereby said operating axis is defined by the direction of movement of said valve element.

19. The valve device of claim 2 wherein said transmission device comprises two levers and upon activation of said valve, said levers are rotatable in identical directions.

20. The valve device of claim 2 wherein said transmission device comprises two levers and upon activation of said valve, said levers are rotatable in opposite directions.

21. The valve device of claim 2 wherein said transmission device comprises two levers, which extend essentially in parallel.

22. The valve device of claim 2 wherein said transmission device comprises two levers, which are arranged with one on top of the other.

23. The valve device of claim 2 wherein said at least one lever has a floating support.

24. The valve device of claim 1 wherein by controlling the degree of valve lift said valve is operable to directly control fuel mass flow rate into an associated combustion chamber of said internal combustion engine.

25. The valve device of claim 1 wherein said valve element is movable to an open position in the direction towards an associated combustion chamber.

26. The valve device of claim 1 wherein said valve element is movable to an open position in the direction away from an associated combustion chamber.

27. The valve device of claim 1 wherein for the purpose of opening or closing said valve, said valve is associated with a restoring device, with said valve being open-able or close-able by operating of said actuator against a restoring force of said restoring device.

28. The valve device of claim 1 further comprising an injection nozzle arranged downstream of said valve.

29. The valve device of claim 1 wherein by controlling valve lift of said valve during an injection event, said valve is operable to shape injection behavior.

30. The valve device of claim 1 wherein said sensor device is capable of detecting the position of said valve element and providing corresponding output signals to a signal processor, said signal processor capable of processing said output signal to produce a processed signal representative of the position of said valve element that is transmittable to a control device associated with said actuator, whereby said control device is programmable to transmit command signals to control activation of said actuator, and wherein, dependent upon said processed signal received from said signal processor, said control device is programmable to transmit command signals to said actuator to limit or reduce free play between said actuator and said valve when said valve is closed or inactive.

31. The valve device of claim 1 wherein said sensor device periodically detects the position of said valve element and provides corresponding output signals to a signal processor each time said sensor device detects said position, wherein said signal processor can process said output signal to produce a processed signal representative of the position of said valve element that is transmittable to a control device which is associated with said actuator whereby said control device is programmable to transmit command signals to control activation of said actuator, and wherein dependent upon said processed signal received from said signal processor, said control device is programmable to transmit command signals to said actuator to limit or reduce free play between said actuator and said valve when said valve is closed or inactive.

32. The valve device of claim 1 wherein said valve device comprises a housing for providing a structure to integrate said actuator, said transmission device, said valve, a restoring device, an injection nozzle and said sensor device.

33. The valve device of claim 1 further comprising a gas-tight seal disposed between said actuator and said transmission device, whereby said gas-tight seal keeps said gaseous fuel from contacting said actuator.

34. The valve device of claim 33 wherein said gas-tight seal comprises a membrane interposed between a plunger of said actuator and said transmission device.

35. A valve device for an internal combustion engine, said valve device comprising the following components that cooperate to inject a gaseous fuel:
 (a) an actuator that operates one of an electromagnetic mode, a piezoelectric mode and a magnetostrictive mode, said actuator capable of being activated to produce a displacement;
 (b) a valve comprising a movable valve element that is movable to open said valve to inject said gaseous fuel by activation of said actuator, wherein distance moved by said movable valve element is defined as valve lift;
 (c) a transmission device disposed between said actuator and said valve, wherein said transmission device comprises at least two series-connected levers and is operative to receive said displacement and produce a valve lift that is greater than said displacement; and
 (d) a restoring device operatively associated with said valve element to apply a restoring force thereto, thereby biasing said valve element in a closed position, said closing force being less than an opening force generated by activation of said actuator.

36. The valve device of claim 35 further comprising a sensor device that is associated with a movable valve element of said valve to detect the position of said valve element.

37. The valve device of claim 35 wherein said transmission device has a transmission ratio greater than 5.

38. The valve device of claim 37 wherein said transmission device has a transmission ratio greater than 10.

39. The valve device of claim 38 wherein said transmission device has a transmission ratio greater than 12.

40. The valve device of claim 39 wherein said transmission device has a transmission ratio greater than 15.

41. The valve device of claim 35 further comprising a spring associated with said transmission device, wherein said spring allows free play between said actuator and the transmission device or a transfer element arranged in between, and removes free play between said levers of said transmission device and between said transmission device and said valve.

42. The valve device of claim 35 wherein said at least one lever is rigid when said transmission device is operative.

43. The valve device of claim 35 wherein said at least one lever is manufactured from materials comprising at least one of a lightweight metal alloy, a composite material and a ceramic.

44. The valve device of claim 35 wherein at least one of said levers is coated in at least some areas or is equipped with a ceramic or hard-metal insert for the purpose of reducing wear.

45. The valve device of claim 35 wherein by controlling the degree of valve lift said valve is operable to directly control fuel mass flow rate into an associated combustion chamber of the internal combustion engine.

46. The valve device of claim 35 wherein by controlling valve lift of said valve during an injection event, said valve is operable to shape injection behavior.

47. A method for the direct injection of a gaseous fuel through a valve device into a combustion chamber of an internal combustion engine, said method comprising:
 (a) biasing a valve element of a valve in a closed position, at which fuel flow through said valve device is blocked, by applying a closing force to said valve element from a restoring device;
 (b) commanding an actuator to produce a displacement corresponding to a desired fuel mass flow rate for an injection event;
 (c) transmitting force from said displacement to said valve through a transmission device, wherein by operation of said transmission device, said valve element is displaced against the force of said restoring device, said displacement of said valve element being greater than said displacement of said actuator;
 (d) detecting the position of the valve element with a sensor device associated with said valve; and
 (e) transmitting command signals to said actuator responsive to signals from said sensor device to activate said actuator to produce a displacement if needed to limit or reduce free play between said actuator and said transmission device when said valve is in said closed position.

48. The method of claim 47 wherein an adjustment process is employed to determine whether a displacement of said actuator is needed to set a base value for activating said actuator to limit or reduce free play between said actuator and said transmission device, said adjustment process comprising:
 progressively activating said actuator when said valve is in said closed position until said sensor device detects an initial actuation of said valve; and
 determining said base value to be a predetermined amount less than the value of the command signal that caused an initial actuation of said valve.

49. The method of claim 48 wherein progressive actuation of said actuator is increased in a stepwise manner.

50. The method of claim 48 wherein said base value is used as a starting point for adjusting said displacement of said actuator in subsequent injection events.

51. The method of claim 48 wherein said predetermined amount is fixed in advance and dependent on at least one of: predetermined operating parameters, a control map, a look up table, or previously determined base values.

52. The method of claim 48 wherein a future base value is determined from a currently determined base value and from previous base values.

53. The method of claim 52 wherein said future base value is dependent on at least one of: predetermined operating parameters, a control map, and a look-up table.

54. The method of claim 48 wherein said adjustment process is repeated after a predetermined number of injection events or engine cycles, or when said sensor device detects that said valve does not return to said closed position when said valve is commanded to be closed.

55. The method of claim 48 further comprising recording said base value and comparing it against subsequently recorded base values to detect wear.

\* \* \* \* \*